(12) United States Patent
Li et al.

(10) Patent No.: US 11,153,424 B2
(45) Date of Patent: Oct. 19, 2021

(54) MOBILE PHONE HOLDER WITH AUTOMATIC CLAMPING FUNCTION

(71) Applicant: SHENZHEN SDION ELECTRONICS & TECHNOLOGY CO., LTD, Shenzhen (CN)

(72) Inventors: Jiayang Li, Shenzhen (CN); Li Liu, Shenzhen (CN)

(73) Assignee: SHENZHEN SDION ELECTRONICS & TECHNOLOGY CO., LTD, Shenzhen (CN)

(*) Notice: Subject to any disclaimer, the term of this patent is extended or adjusted under 35 U.S.C. 154(b) by 31 days.

(21) Appl. No.: 16/855,025

(22) Filed: Apr. 22, 2020

(65) Prior Publication Data

US 2020/0252494 A1 Aug. 6, 2020

Related U.S. Application Data

(63) Continuation of application No. PCT/CN2019/099877, filed on Aug. 9, 2019.

(30) Foreign Application Priority Data

Aug. 13, 2018 (CN) .......................... 201821298744.6

(51) Int. Cl.
  *H04M 1/04* (2006.01)
(52) U.S. Cl.
  CPC ..................................... *H04M 1/04* (2013.01)

(58) Field of Classification Search
  CPC .... F16B 1/00; F16B 4/00; H01F 7/00; H04M 1/04; H04M 1/725; H04B 1/3888; H04B 1/3877; A45F 5/02; B60R 2011/0071; B60R 11/0241
  See application file for complete search history.

(56) References Cited

U.S. PATENT DOCUMENTS

| 5,697,071 A * | 12/1997 | Fan ...................... H04B 1/3833 |
| | | 220/4.02 |
| 9,969,450 B1 * | 5/2018 | Lu ............................ B62J 11/00 |
| D870,095 S * | 12/2019 | Hu ............................... D14/253 |
| 2008/0110946 A1 * | 5/2008 | Dixon ................. B60R 11/0241 |
| | | 224/197 |
| 2016/0014243 A1 * | 1/2016 | Snowden ............. H04B 1/3877 |
| | | 455/575.1 |
| 2019/0126843 A1 * | 5/2019 | Bouchard ............... B60R 16/03 |
| 2020/0282920 A1 * | 9/2020 | Yang ...................... B60R 11/02 |

* cited by examiner

*Primary Examiner* — Ankur Jain
(74) *Attorney, Agent, or Firm* — WPAT, PC

(57) ABSTRACT

The present invention discloses a mobile phone holder with an automatic clamping function. The mobile phone holder includes a base and an automatic clamping mechanism. The automatic clamping mechanism includes a clamping arm, a gear, a one-way ratchet, a key spring, a button, and a driving component. The clamping arm is slidably mounted on the base, a clamping space is defined between the clamping arm and the base, the clamping arm is provided with a rack portion, the gear is rotatably mounted in the base, the rack portion is engaged with the gear, the one-way ratchet is mounted above the gear, the one-way ratchet rotates along with the gear, the key spring is elastically clamped between the gear and the one-way ratchet, ratchet teeth are disposed on the upper end of the one-way ratchet, a clamping slot is disposed on the base, the button is mounted above the one-way ratchet.

20 Claims, 7 Drawing Sheets

MOBILE PHONE HOLDER WITH AUTOMATIC CLAMPING FUNCTION

FIELD OF THE DISCLOSURE

The present invention relates to the technical field of mobile phone holders, in particular to a mobile phone holder with an automatic clamping function.

BACKGROUND

With the increasing variety of electronic products, mobile phones have become an indispensable electronic product in lives of people. With the increasing functions of the mobile phones, the navigation function has become an indispensable part of many people. However, the current mobile phone holder used for fixing the mobile phones has a semi-automatic structure, and will be fixed after being stretched to a certain distance. After the mobile phone is placed, the mobile phone holder is closed to clamp the mobile phone, thereby realizing the fixation of the mobile phone. The mobile phone can only be placed into such type of mobile phone holder after a pedestal is separated with force by hand to allow the width of the pedestal to be the same as the width of the mobile phone, which not only requires two-handed operation, but also may affect driving. Therefore, the existing mobile phone holder should be improved to enhance the automation of the mobile phone holder to solve the above problem.

In order to improve the automation of the mobile phone holders, some merchants have proposed an electric mobile phone holder. However, since such mobile phone holders are electrically controlled, the production cost is high.

SUMMARY

The technical problem to be solved by the present invention is to provide a mobile phone holder with a function regarding the deficiencies of the prior art. The mobile phone holder can automatically clamp the mobile phone to release hands of a user, which is convenient for use of the user. Besides, the mobile phone holder does not need electric control, thereby effectively reducing the production cost.

A mobile phone holder with an automatic clamping function, including: a base and an automatic clamping mechanism disposed on the base, wherein the automatic clamping mechanism includes a clamping arm, a gear, a one-way ratchet, a key spring, a button and a driving component for driving the gear to rotate, the clamping arm is slidably mounted on the base, a clamping space for clamping a mobile phone or a tablet computer is defined between the clamping arm and the base, the clamping arm is provided with a rack portion, the gear is rotatably mounted in the base, the rack portion is engaged with the gear, the one-way ratchet is mounted above the gear, the one-way ratchet rotates along with the gear, the key spring is elastically clamped between the gear and the one-way ratchet, the upper end of the one-way ratchet is provided with ratchet teeth, the base is provided with a clamping slot adapted to the ratchet teeth, the button is mounted above the one-way ratchet, and the base is provided with an opening for the upper end of the button to penetrate through.

Optionally, four clamping arms are disposed, the four clamping arms are slidably disposed on the base diagonally two by two, the gear is a linkage gear, the linkage gear includes an upper gear portion and a lower gear portion which are integrally connected, the rack portion is engaged with the upper gear portion, the driving component includes two driving members and two driving springs, the two driving members can be slidably disposed on the base in a face-to-face or back-to-back manner, the driving member is provided with a driving rack portion, the driving rack portion is engaged with the lower gear portion, the base is provided with two baffles, the two baffles are disposed on both sides of the lower gear portion respectively, one driving spring is elastically clamped between one driving member and the baffle disposed adjacent to such driving member, one end of the driving spring abuts against the inner side wall of the driving member, and the other end of the driving spring abuts against the outer side wall of the baffle.

Optionally, the lower end of the one-way ratchet is provided with a limiting column protruding downward, the linkage gear is axially provided with a limiting slot adapted to the limiting column, the one-way ratchet is clamped into the limiting slot through the limiting column and mounted above the linkage gear, and rotates along with the linkage gear, the lower end of the button is provided with a first mounting column, the upper end of the one-way ratchet is provided with a mounting hole adapted to the first mounting column, and the button is clamped into the mounting hole by the first mounting column and mounted on the one-way ratchet.

Optionally, the upper end of the linkage gear is provided with a spring mounting slot for mounting the key spring, one end of the key spring abuts against the slot bottom of the spring mounting slot, and the other end of the key spring abuts against the lower surface of the one-way ratchet.

Optionally, the base includes a bottom case and a surface cover, the bottom case is provided with a receiving slot, the receiving slot is provided with a second mounting column therein, the linkage gear is provided with a mounting slot adapted to the second mounting column, the second mounting column is provided with a screw hole axially, the linkage gear is provided with a through hole adapted to the screw hole, the through hole, the mounting slot and the limiting slot communicate with each other, the linkage gear is rotatably mounted on the bottom case by the cooperation between the second mounting column and the mounting slot and by the cooperation between the bolt penetrating through the through hole and the screw hole, the two baffles are disposed on the bottom case, and the clamping slot and the opening are both disposed in the surface cover.

Optionally, the base further includes a middle case disposed between the bottom case and the surface cover, the linkage gear further includes a connecting portion connected to the upper gear portion and the lower gear portion, the middle case is provided with a first through slot adapted to the connecting portion, the upper gear portion protrudes from the upper surface of the middle case, the upper end of the middle case is provided with two placing slots consistent with the diagonal direction of the middle case, the two placing slots intersect with each other, each placing slot is provided with two relatively staggered guide bars along the direction per se, the clamping arm is provided with chutes adapted to the guide bars, the four clamping arms are matched with the guide bars by the chutes to be slidably disposed in the two placing slots in a two-by-two relatively staggered manner, the placing slots are divided into a first placing slot and a second placing slot, the depth of the first placing slot is greater than the depth of the second placing slot, the mounting slot is disposed on the lower gear portion, the through hole is disposed in the connecting portion, and the limiting slot and the spring mounting slot are disposed on the upper gear portion.

Optionally, the linkage gear includes a gear portion, a mounting portion, and a connecting portion connected to the gear portion and the mounting portion, the mounting slot is disposed on the gear portion, the through hole is disposed in the connecting portion, and the limiting slot and the spring mounting slot are disposed on the mounting portion.

Optionally, the two driving members have the same structure, the driving member includes a first main body portion and a first guide portion and a second guide portion which are formed by transverse extending from one end of the first main body portion, the first guide portion and the second guide portion are disposed in parallel, the second guide portion is provided with a first guide slot adapted to the first guide portion, the two driving members are clamped into the first guide slot by the first guide portion and can be disposed in the receiving slot in a transversely face-to-face or back-to-back slidable manner, the driving rack portion is disposed on the inner side wall of the second guide portion, the first main body portion is provided with a first positioning column, the first positioning column is disposed in parallel between the first guide portion and the second guide portion, and the driving spring sleeves outside the first positioning column.

Optionally, two clamping arms are disposed, the two clamping arms can be disposed on the base in a transversely face-to-face or back-to-back slidable manner, the gear is a single-acting gear, the driving component is a driving spring, the base is provided with two baffles, the two baffles are respectively disposed on both sides of the single-acting gear, two driving springs are disposed, one driving spring is elastically clamped between one clamping arm and the baffle disposed adjacent to such clamping arm, one end of the driving spring abuts against the inner side wall of the clamping arm, and the other end of the driving spring abuts against the outer side wall of the baffle.

Optionally, the lower end of the one-way ratchet is provided with a limiting enclosure plate protruding downward, the single-acting gear is axially provided with a limiting slot adapted to the limiting enclosure plate, a plurality of downward protruding limiting clamping blocks are disposed at the lower end of the limiting enclosure plate, the single-acting gear is provided with a limiting clamping slot adapted to the limiting clamping blocks, the limiting clamping slot and the limiting slot communicate with each other, the one-way ratchet is clamped into the limiting slot through the limiting enclosure plate, the limiting clamping blocks are clamped into the limiting clamping slot and are mounted above the single-acting gear, and rotate along with the single-acting gear, the lower end of the button is provided with a first mounting column, the upper end of the one-way ratchet is provided with a mounting hole adapted to the first mounting column, and the button is clamped into the mounting hole through the first mounting column and mounted on the one-way ratchet.

Optionally, a spring mounting slot for mounting a key spring is disposed at the lower end of the one-way ratchet, one end of the key spring abuts against the upper surface of the single-acting gear, and the other end of the key spring abuts against the slot bottom of the spring mounting slot.

Optionally, the base includes a bottom case and a surface cover, the bottom case is provided with a receiving slot, the receiving slot is provided with a second mounting column therein, the single-acting gear is provided with a mounting slot adapted to the second mounting column, the second mounting column is axially provided with a screw hole, the mounting slot and the limiting clamping slot communicate with each other, the single-acting gear is rotatably mounted on the bottom case by the cooperation between the second mounting column and the mounting slot and the cooperation between the bolt and the screw hole, two baffles are disposed on the bottom case, and the clamping slot and the opening are both disposed on the surface cover.

Optionally, the two clamping arms have the same structure, the clamping arm includes a second main body portion, a side clamping portion formed by bending upward from one end of the second main body portion, and a third guide portion and a fourth guide portion formed by transversely extending from the other end of the second main body portion, the third guide portion and the fourth guide portion are disposed in parallel with each other, the fourth guide portion is provided with a second guide slot adapted to the third guide portion, the two clamping arms are clamped into the second guide slot through the third guide portion, and can be slidably disposed in the receiving slot in a face-to-face or back-to-back manner, the rack portion is disposed on the inner side wall of the fourth guide portion, the second main body portion is provided with a second positioning column, the second positioning column is disposed in parallel between the third guide portion and the fourth guide portion, the driving spring sleeves outside the second positioning column, a pressing portion for driving the two clamping arms to slide in a back-to-back manner is disposed on the outer side wall of the third guide portion, and the pressing portion extends from the outer side wall of the bottom case.

Optionally, two clamping arms are disposed, the two clamping arms can be disposed on the base in a transversely face-to-face or back-to-back slidable manner, the driving component is a driving tension spring, the lower end of the clamping arm is provided with an upwardly concave groove, a third mounting column protruding downward is disposed in the groove, one driving tension spring is disposed, one end of the driving tension spring sleeves outside the third mounting column of one of the clamping arms, the other end of the driving tension spring sleeves outside the third mounting column of the other clamping arm, and the gear is a single-acting gear.

Optionally, the lower end of the one-way ratchet is provided with a limiting enclosure plate protruding downward, the single-acting gear is axially provided with a limiting slot adapted to the limiting enclosure plate, a plurality of downward protruding limiting clamping blocks are disposed at the lower end of the limiting enclosure plate, the single-acting gear is provided with a limiting clamping slot adapted to the limiting clamping blocks, the limiting clamping slot and the limiting slot communicate with each other, the one-way ratchet is clamped into the limiting slot through the limiting enclosure plate, and the limiting clamping blocks are clamped into the limiting clamping slot and are mounted above the single-acting gear and rotate along with the single-acting gear.

Optionally, a spring mounting slot for mounting a key spring is disposed at the lower end of the one-way ratchet, one end of the key spring abuts against the upper surface of the single-acting gear abuts, and the other end of the key spring abuts against the slot bottom of the spring mounting slot.

Optionally, the base includes a bottom case and a surface cover, the bottom case is provided with a receiving slot, the receiving slot is provided with a second mounting column therein, the single-acting gear is provided with a mounting slot adapted to the second mounting column, the second mounting column is axially provided with a screw hole, the mounting slot and the limiting clamping slot communicate with each other, the single-acting gear is rotatably mounted on the bottom case by the cooperation between the second mounting column and the mounting slot and the cooperation between the bolt and the screw hole, the clamping slot and the opening are both disposed on the surface cover.

Optionally, the lower end of the button is provided with a first mounting column, the upper end of the one-way ratchet is provided with a mounting groove adapted to the first mounting column, a first limiting enclosure slot adapted to the one-way ratchet and a second limiting enclosure slot adapted to the button are disposed at the lower end of the surface cover, the first limiting enclosure slot the second limiting enclosure slot communicate with each other, the clamping slot is disposed at the slot bottom of the first limiting enclosure slot, the opening is disposed in the axial direction of the first limiting enclosure slot and the second limiting enclosure slot, and the upper surface of the button penetrates through the opening to extend out of the upper surface of the surface cover.

Optionally, the clamping arms are divided into a first clamping arm and a second clamping arm, the first clamping arm includes a third main body portion, a first side clamping portion formed by bending upward from one end of the third main body portion, and a fifth guide portion formed by extending transversely and outward from the other end of the third main body portion, the second clamping arm includes a fourth main body portion, a second side clamping portion formed by bending upward from one end of the fourth main body portion, and a sixth guide portion formed by extending transversely and outward from the other end of the fourth main body portion, the fifth guide portion and the sixth guide portion are oppositely disposed forward and backward, the third main body portion is provided with a third guide slot adapted to the sixth guide portion, the fourth main body portion is provided with a fourth guide slot adapted to the fifth guide portion, the third guide slot and the fourth guide slot are oppositely disposed forward and backward, the first clamping arm and the second clamping arm are clamped into the fourth guide slot by the fifth guide portion, are clamped into the third guide slot by the sixth guide portion, and can be disposed in the receiving slot in a face-to-face or back-to-back slidable manner, two rack portions are disposed and are a first rack portion and a second rack portion respectively, the first rack portion is disposed on the inner side wall of the fifth guide portion, the second rack portion is disposed on the inner side wall of the sixth rack portion, each of the lower ends of the third main body portion and the fourth main body portion is provided with the above groove and the third positioning column, the lower ends of the fifth guide portion and the sixth guide portion are provided with a fifth guide slot, and the receiving slot is provided with a first guide block adapted to the fifth guide slot therein.

Optionally, a pressing block is disposed at each of the front end of the third main body portion and the front end of the fourth main body portion, the pressing block includes a vertical portion, a transverse portion formed by bending inward from the front end of the vertical portion, and a pressing portion formed by bending downward from the tail end of the transverse portion, the transverse portions of the two pressing blocks overlap with each other, and the pressing portions of the two pressing blocks extend out from the outer side wall of the bottom case.

Optionally, the mobile phone holder further includes a wireless charging coil, a circuit board and a power source, wherein the base further includes a middle case disposed between the base case and the surface cover, the middle case is provided with a third placing slot adapted to the wireless charging coil and a second through slot for the one-way ratchet to adaptively penetrate through, the second through slot is disposed in the middle of the third placing slot, the wireless charging coil is placed in the third placing slot, the circuit board and the power source are disposed on the bottom case, the wireless charging coil is electrically connected to the circuit board, and the circuit board is electrically connected to the power source.

Optionally, the mobile phone holder further includes an undercarriage movable forward and backward, wherein the undercarriage includes an undercarriage main body portion and a support portion formed by bending upward from the front end of the undercarriage main body portion, the two side ends of the undercarriage main body portion are provided with elastic arms capable of being transversely deformed, the outer side walls of the elastic arms are provided with positioning clamping blocks protruding outward, the surface cover is provided with a retreating slot adapted to the undercarriage main body portion, two side walls of the retreating slot are provided with positioning clamping slots adapted to the positioning clamping blocks, the lower end of the undercarriage main body portion is provided with a sixth guide slot disposed frontward and backward, and the middle case is provided with a second guide block adapted to the sixth guide slot.

Optionally, the positioning clamping block is provided with a first inclined surface inclined inward from front to back, and a second inclined surface inclined inward from back to front, the first inclined surface forms a first included angle with a movement direction of the undercarriage, the second inclined surface forms a second included angle with the movement direction of the undercarriage, and the first included angle is less than the second included angle.

The present invention has the beneficial effects that the mobile phone can be automatically clamped through the cooperation of a clamping arm, a gear, a one-way ratchet, a key spring, a button and a driving component. The process does not require manual operation, the hands of the user can be released, it is convenient for use of the user, and a better experience is brought to the user. Since the structure of the mobile phone holder is a mechanical structure, no electric control is required, the production cost can be effectively reduced, and the mobile phone holder is easy to be widely promoted. The mobile phone holder is provided with a wireless charging coil, a circuit board and a power source, thereby increasing the use of the mobile phone holder and being more convenient for the user. The mobile phone holder is provided with a base that can be moved forward and backward, so that the mobile phone holder can hold the mobile phone more steadily, and the use experience of the user is better.

DETAILED DESCRIPTION OF PREFERRED EMBODIMENTS

Figure 1:
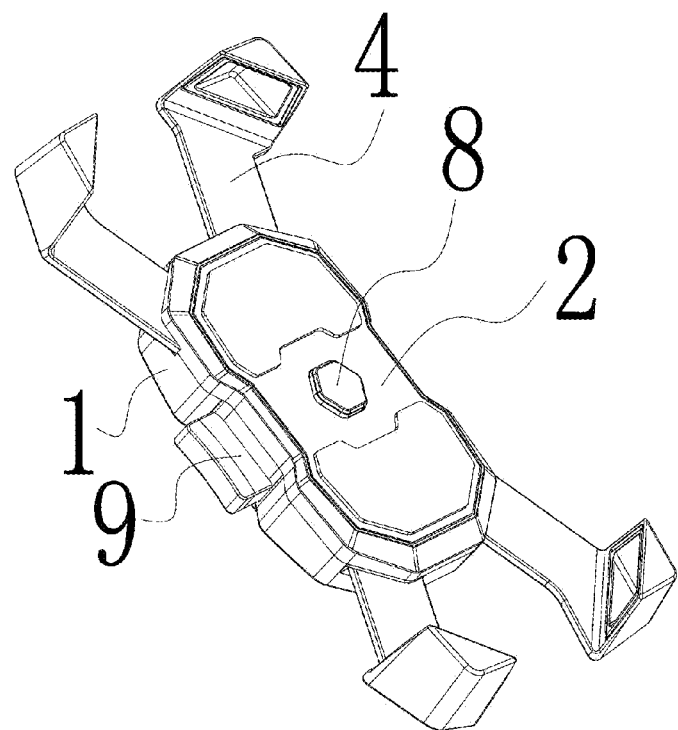
FIG. 1 is an assembling structural diagram according to an embodiment of the present invention.
Figure 2:
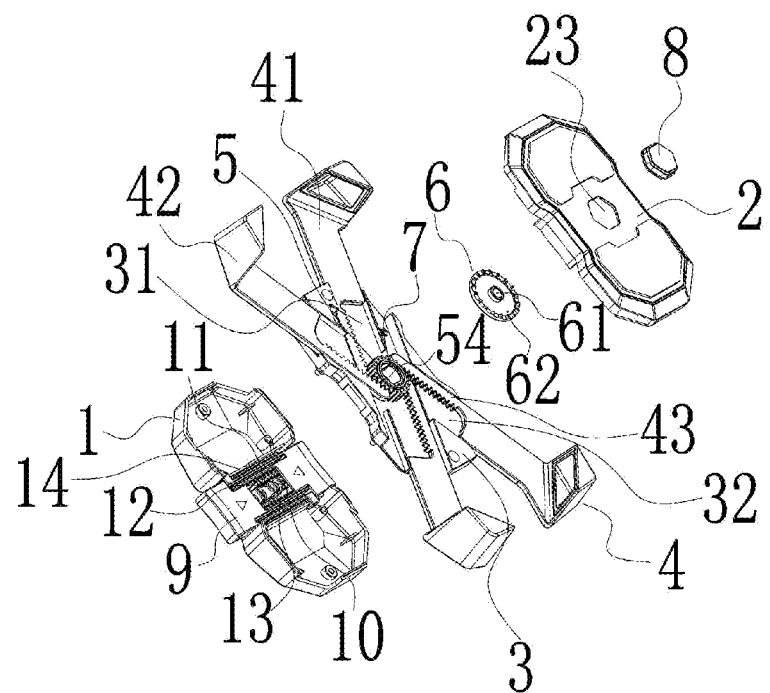
FIG. 2 is an exploded view according to an embodiment of the present invention.
Figure 3:
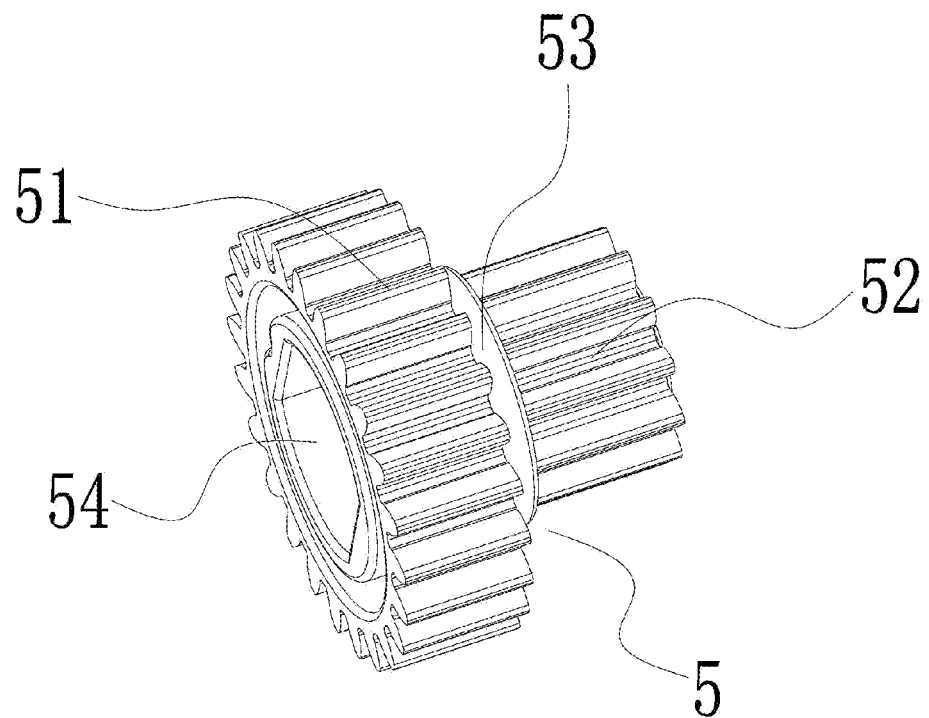
FIG. 3 is a structural diagram of a linkage gear according to an embodiment of the present invention.
Figure 4:
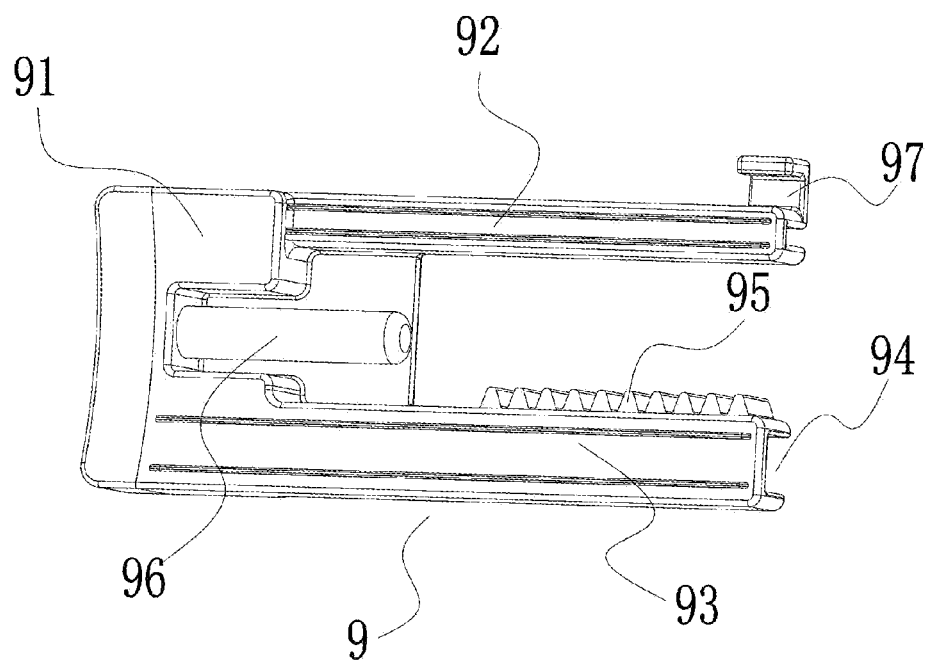
FIG. 4 is a structural diagram of a driving member according to an embodiment of the present invention.
Figure 5:
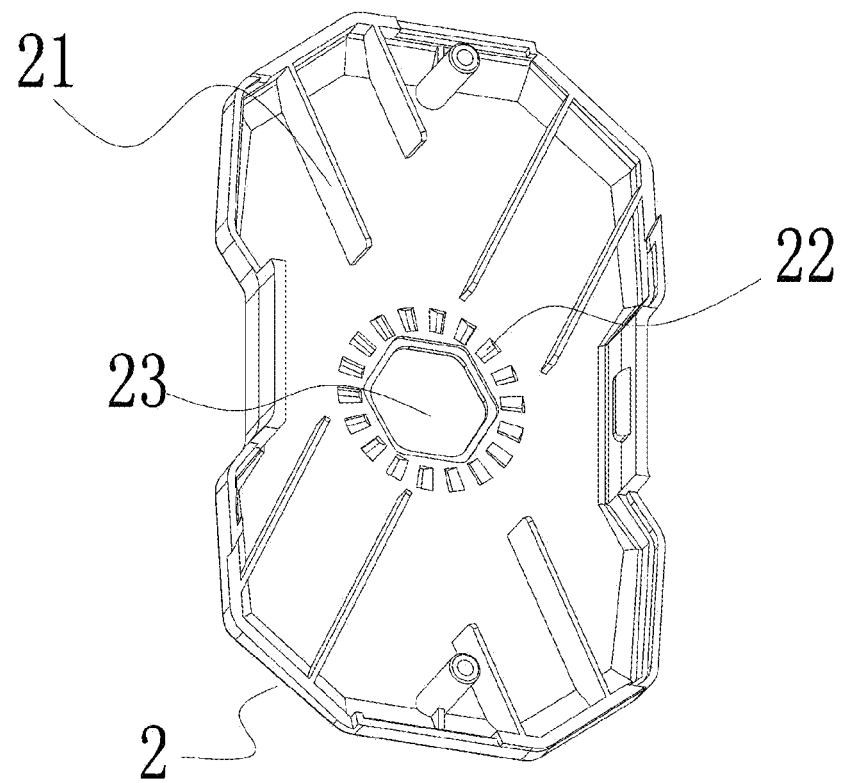
FIG. 5 is a structural diagram of a surface cover according to an embodiment of the present invention.

The structural principle and working principle of the present invention will be further described in detail below with reference to the accompanying drawings.

Embodiment 1 is as shown in FIG. 1 to FIG. 5 and is a mobile phone holder with an automatic clamping function, which includes a base and an automatic clamping mechanism disposed on the base. The base includes a bottom case 1, a surface cover. 2 and a middle case 3 disposed between the bottom case 1 and the surface cover 2. The automatic clamping mechanism includes clamping arms 4, a gear, a one-way ratchet 6, a key spring 7, a button 8, and a driving component gear for driving the gear to rotate.

The number of the clamping arms 4 is four. The clamping arm 4 includes an arm portion 41, an angle clamping portion 42 formed by bending upward from one end of the arm portion 41, and a rack portion 43 formed by extending outward from the other end of the arm portion 41. The upper end of the middle case 3 is provided with two placing slots consistent with the diagonal direction of the middle case, the two placing slots intersect with each other, and each placing slot is provided with two relatively staggered guide bars along the direction per se. The clamping arm 4 is provided with chutes adapted to the guide bars, and the four clamping arms 4 are matched with the guide bars by the chutes to be disposed in the two placing slots in a two-by-two relatively staggered manner, and slide along the diagonal direction of the middle case in a face-to-face or back-to-back manner. The placing slots are divided into a first placing slot 31 and a second placing slot 32, and the depth of the first placing slot 31 is greater than the depth of the second placing slot 32. The lower end of the surface cover 2 is provided with ribs 21 adapted to the first placing slot 31 and the second placing slot 32. The four angle clamping portions 43 and the base form a space for clamping a mobile phone or a tablet computer.

The gear is a linkage gear 5. The linkage gear 5 includes an upper gear portion 51 and a lower gear portion 52 that are integrally connected, and a connecting portion 53 connected to the upper gear portion 51 and the lower gear portion 52. The bottom case 1 is provided with a first mounting column 11. The lower gear portion 52 is axially provided with a mounting slot adapted to the second mounting column 11. The second mounting column 11 is axially provided with a screw hole 12, the connecting portion 53 is provided with a through hole adapted to the screw hole 12 and the through hole and the mounting slot communicate with each other. The linkage gear 5 is rotatably mounted on the bottom case 1 by the cooperation between the second mounting column and the mounting slot and by the cooperation between the bolt penetrating through the through hole and the screw hole. The middle case 3 is provided with a first through slot adapted to the connecting portion 53, the upper gear portion 51 protrudes from the upper surface of the middle case 3, and the rack portion 43 is engaged with the upper gear portion 51.

The lower end of the one-way ratchet 6 is provided with a limiting column protruding downward. The upper gear portion 51 is axially provided with a limiting slot 54 adapted to the limiting column. The one-way ratchet 6 is clamped into the limiting slot 54 by the limiting column and is mounted above the linkage gear 5 and rotates along with the linkage gear 5.

The upper gear portion 51 is provided with a spring mounting slot for mounting the key spring 7. One end of the key spring 7 abuts against the slot bottom of the spring mounting slot. The other end of the key spring 7 abuts against the lower surface of the one-way ratchet 6. The lower end of the button 8 is provided with a first mounting column, the upper end of the one-way ratchet 6 is provided with a mounting hole 61 adapted to the first mounting column, and the button 8 is clamped in the mounting hole 61 by the first mounting column and is mounted on the one-way ratchet 6. The upper end of the one-way ratchet 6 is provided with ratchet teeth 62, and the lower end of the surface cover 2 is provided with a clamping slot 22 adapted to the ratchet teeth 62. The surface cover 2 is provided with an opening 23 through which the upper end of the button 8 penetrates, and the button 8 penetrates through the opening 23 to extend out of the upper surface of the surface cover 2.

The driving component includes two driving members 9 and two driving springs 10. The bottom case 1 is provided with a receiving slot. The two driving members 9 have the same structure. The driving member 9 includes a first body portion 91 and a first guide portion 92 and a second guide portion 93 which are formed by transversely extending from one end of the first body portion 91. The first guide portion 92 and the second guide portion 93 are disposed in parallel. The second guide portion 93 is provided with a first guide slot 94 adapted to the first guide portion 93. The two driving members 9 are clamped into the first guide slot 93 through the first guide portion 92 and are disposed in the receiving slot in a transversely face-to-face or back-to-back slidable manner. A driving rack portion 95 is disposed on the inner side wall of the second guide portion 93, and the driving rack portion 95 is engaged with the lower gear portion 52. The receiving slot is provided with two baffles 13 therein, and the two baffles 13 are respectively disposed on two sides of the lower gear portion 52. One driving spring 10 is elastically clamped between one driving member 9 and the baffle plate 13 disposed adjacent to the driving member 8. The first main body portion 91 is provided with a first positioning column 96, and the first positioning column 96 is disposed in parallel between the first guide portion 92 and the second guide portion 93. The driving spring 10 sleeves outside the first positioning column 96. One end of the driving spring 10 abuts against the inner side wall of the driving member 9, and the other end of the driving spring 10 abuts against the outer side wall of the baffle 13.

As a preferred solution, the bottom case 1 is further provided with a limiting plate 14, the limiting plate 14 is disposed at the upper and lower ends of the receiving slot, and the first guide portion 92 is provided with a limiting clamping slot 97 adapted to the limiting plate 14. In this way, the maximum thread of the two driving members 9 can be limited, and the two driving members 9 will not be released from the bottom case 1, thereby improving the working stability of the mobile phone holder.

During use, the mobile phone is pressed on the button, the button 8 is moved downward under the weight action of the mobile phone, and the one-way ratchet 6 is moved downward therewith until the ratchet teeth 62 are released from the clamping slot 22 at the lower end of the surface cover 2. The driving spring 10 is in a compressed state at this point, and under the action of the driving spring 10, the two driving members 9 slide in a back-to-back manner. Under driving of the driving rack portions 95, the linkage gear 5 is rotated, and under driving of the linkage gear 5, the four clamping arms 4 are moved in a face-to-face manner along the diagonal line of the base until the mobile phone is clamped.

During resetting, the driving members 9 are pressed by hand to slide in a face-to-face manner. Under driving of the driving rack portions 95, the linkage gear 5 is rotated. Under driving of the linkage gear 5, the four clamping arms 4 are moved in a back-to-back manner along the diagonal line direction of the base until the one-way ratchet 6 is re-clamped in the clamping slot 22 under the action of the key spring 7.

Figure 6:
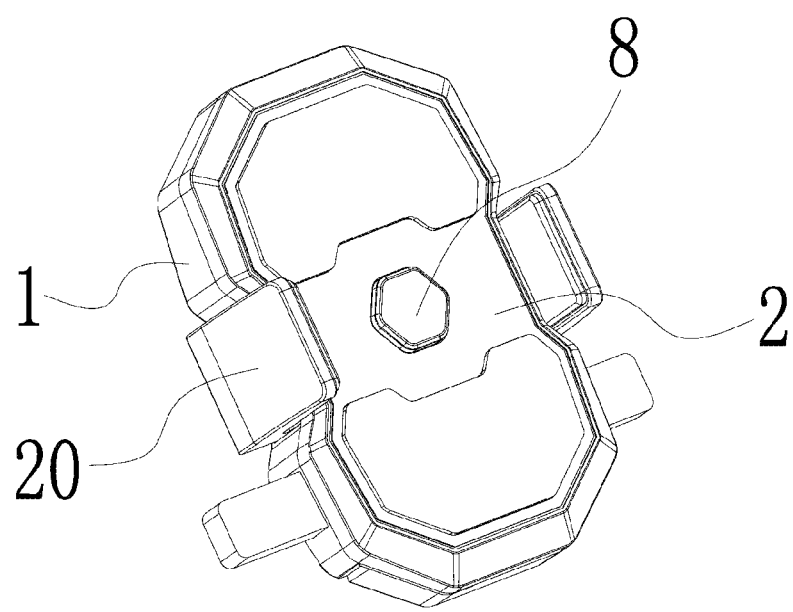
FIG. 6 is an assembling structural diagram according to Embodiment 2 of the present invention.
Figure 7:
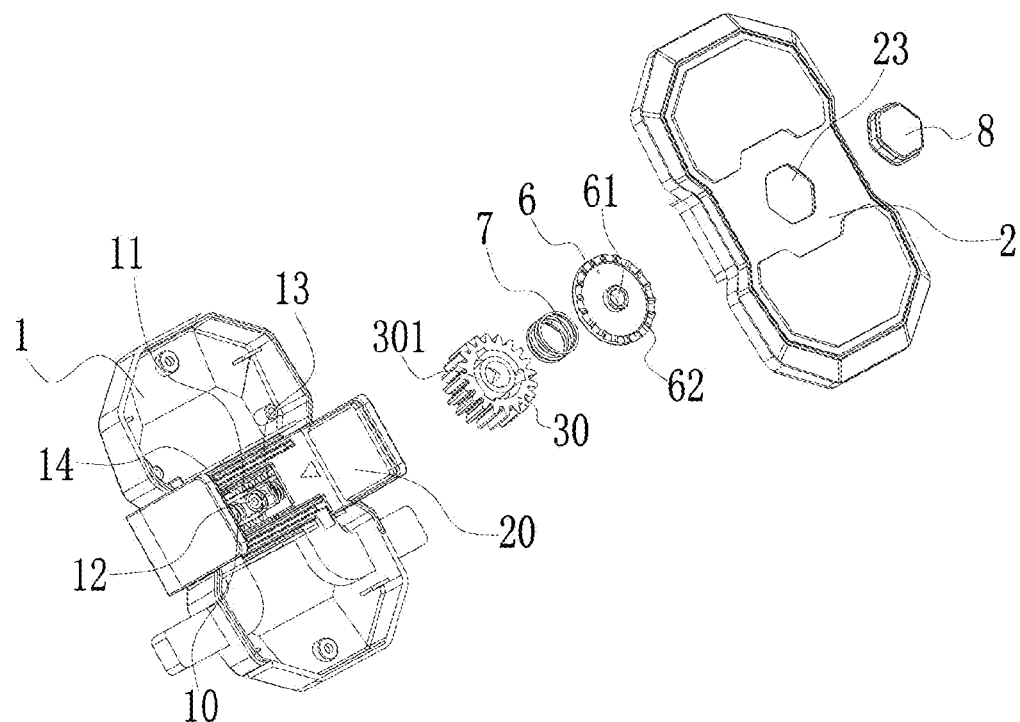
FIG. 7 is an exploded view according to Embodiment 2 of the present invention.
Figure 8:
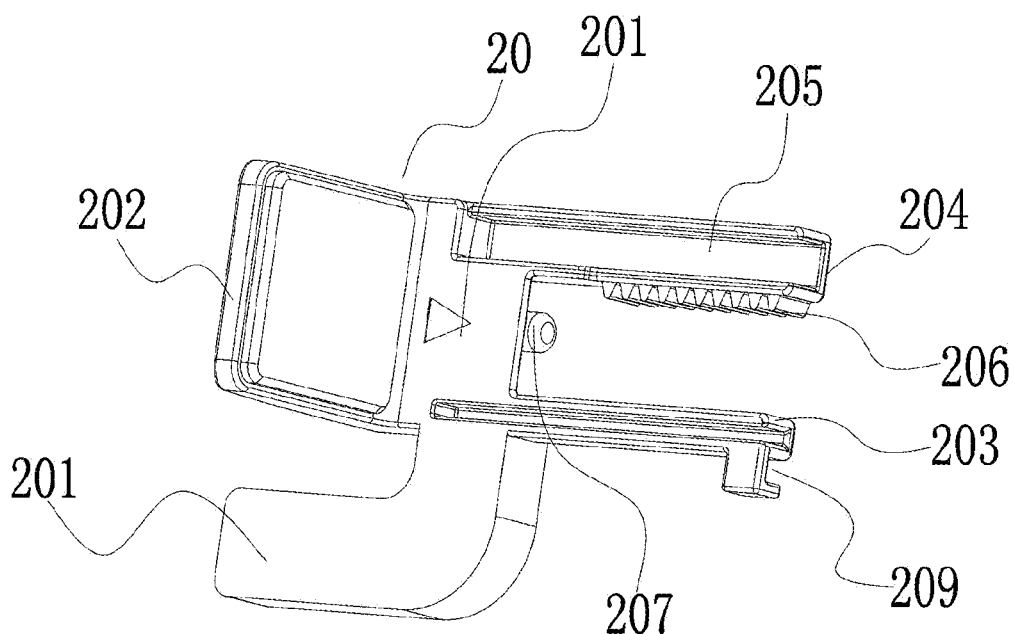
FIG. 8 is a structural diagram of a clamping arm according to Embodiment 2 of the present invention.
Figure 9:
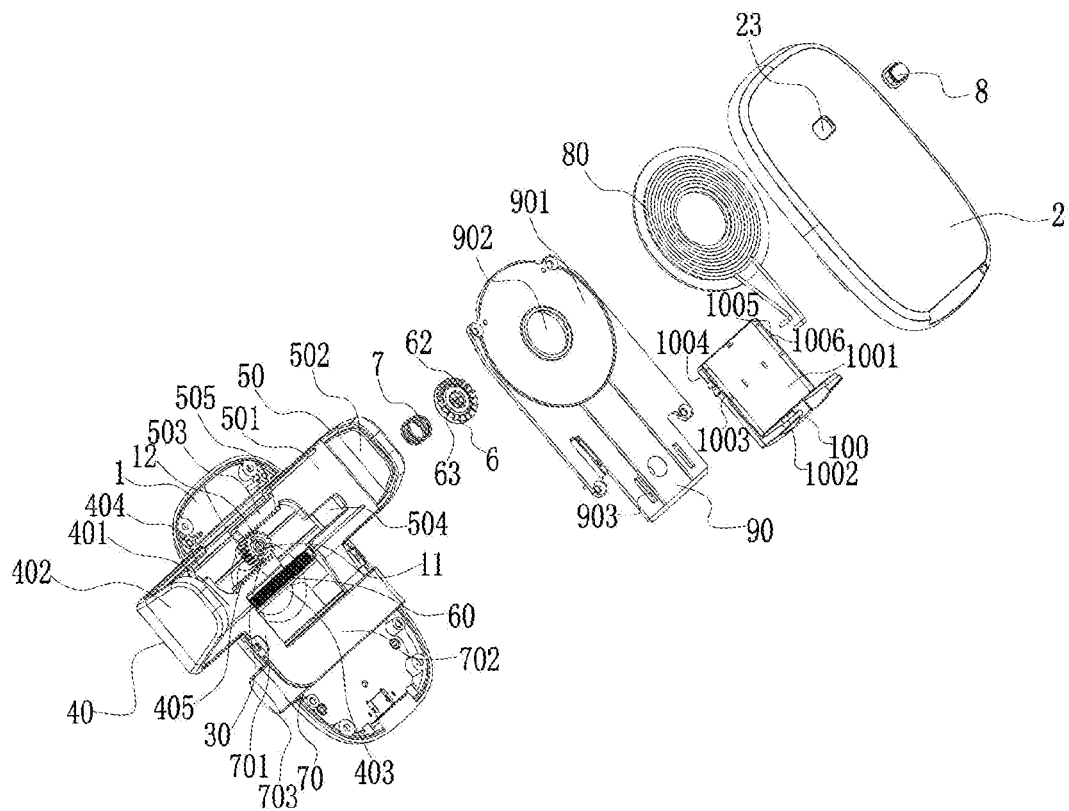
FIG. 9 is an exploded view according to Embodiment 3 of the present invention.
Figure 10:
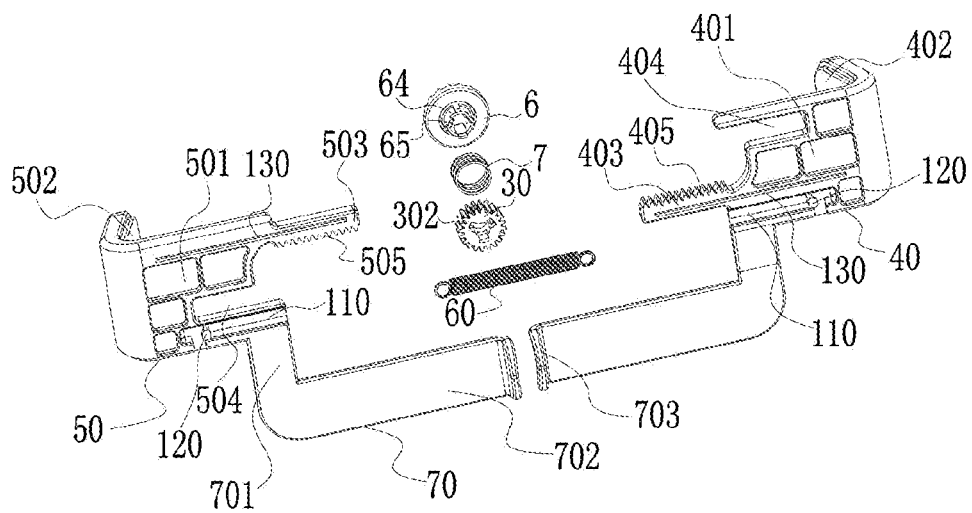
FIG. 10 is an exploded view of a first clamping arm, a second clamping arm, a driving tension spring, a single-acting gear, a key spring, and a one-way ratchet according to Embodiment 3 of the present invention.
Figure 11:
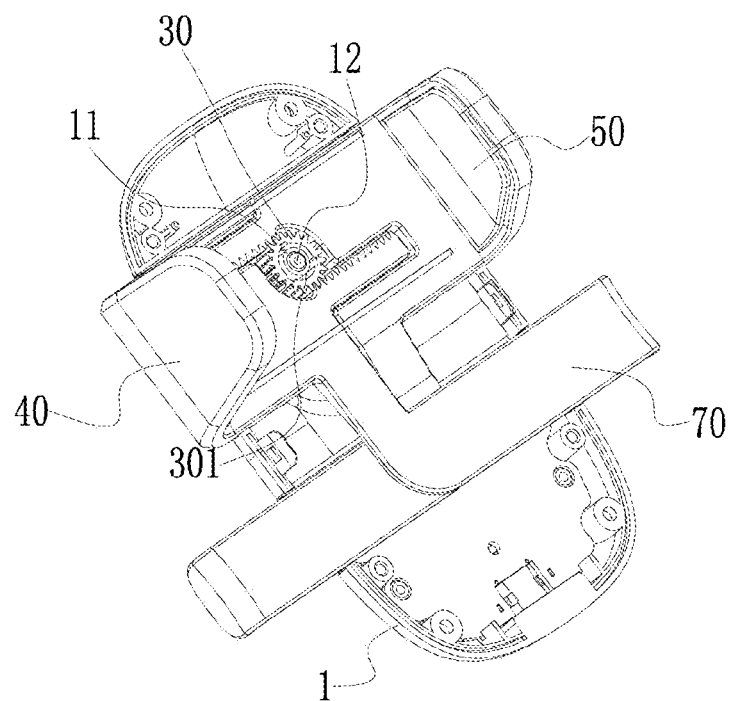
FIG. 11 is an assembling structural diagram of a first clamping arm, a second clamping arm, and a bottom case in a clamped state according to Embodiment 3 of the present invention.
Figure 12:
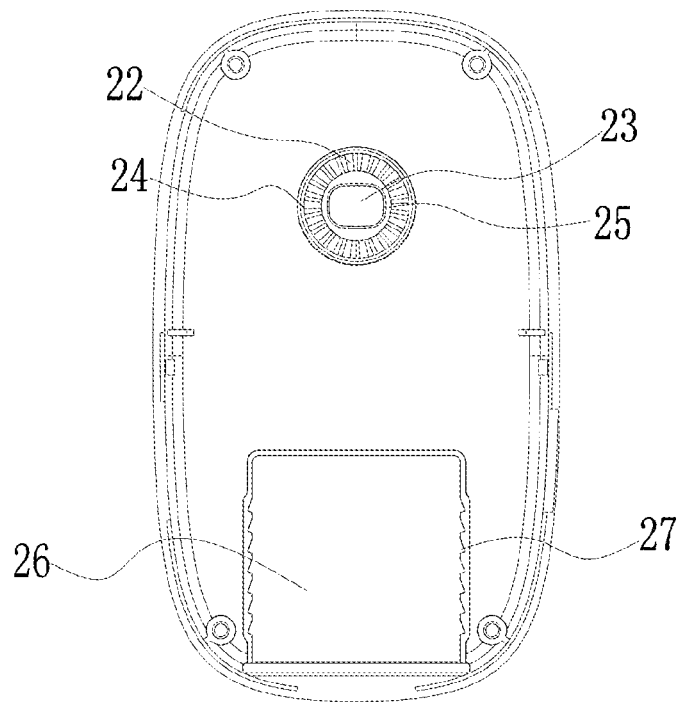
FIG. 12 is a structural diagram of a surface cover according to Embodiment 3 of the present invention.
Figure 13:
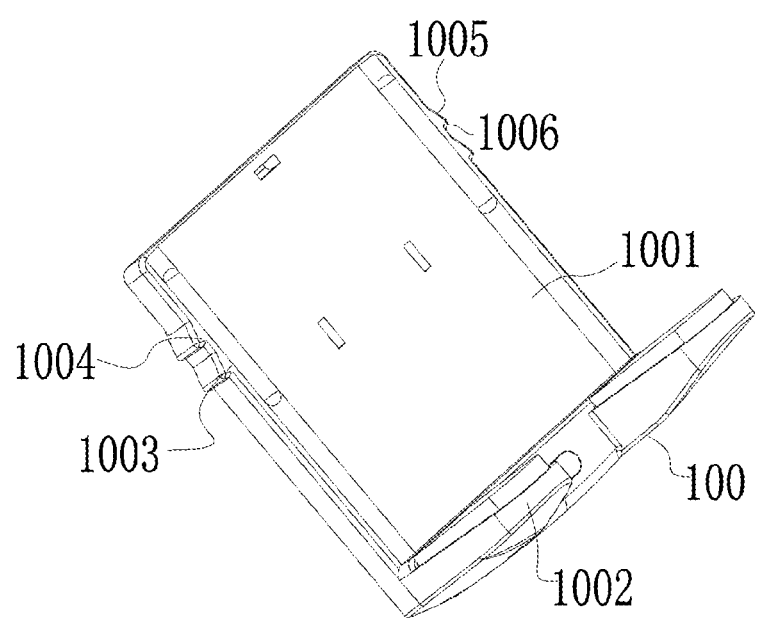
FIG. 13 is a structural diagram of an undercarriage according to Embodiment 3 of the present invention.

Embodiment 2 is as shown in FIG. 6 to FIG. 8 and is a mobile phone holder with a clamping function, including a base and an automatic clamping mechanism disposed on the base. The base includes a bottom case 1 and a surface cover 2. The automatic clamping mechanism includes clamping arms 20, a gear, a one-way ratchet 6, a key spring 7, a button 8, and a driving component for driving the gear to rotate.

The number of the clamping arms 20 is two. The two clamping arms 20 have the same structure, the clamping arm 20 includes a second main body portion 201, a side clamping portion 202 formed by bending upward from one end of the second main body portion 201, and a third guide portion 203 and a fourth guide portion 204 formed by transversely extending from the other end of the second main body portion 201. The third guide portion 203 and the fourth guide portion 204 are disposed in parallel with each other, the fourth guide portion 204 is provided with a second guide slot 205 adapted to the third guide portion 203, and the two clamping arms 20 are clamped into the second guide slot 205 through the third guide portion 203, and can be disposed in the receiving slot in a face-to-face or back-to-back slidable manner. The clamping portions 202 on both sides and the base form a clamping space for clamping a mobile phone or a tablet computer.

The gear is a single-acting gear 30, and a second mounting column 11 is disposed in the receiving slot. The single-acting gear 30 is provided with a mounting slot adapted to the second mounting column 11, and the second mounting column 11 is axially provided with a screw hole 12. The single-acting gear 30 is rotatably mounted on the bottom case 1 by the cooperation between the second mounting column 11 and the mounting slot and the cooperation between the bolt and the screw hole 12, a rack portion 206 is disposed on the inner side wall of the fourth guide portion 204, and the rack portion 206 is engaged with the single-acting gear 30.

The lower end of the one-way ratchet 6 is provided with a limiting enclosure plate 64 protruding downward. The single-acting gear 30 is axially provided with a limiting slot 301 adapted to the limiting enclosure plate 64, and a plurality of downward protruding limiting clamping blocks 65 are disposed at the lower end of the limiting enclosure plate 64. The single-acting gear 30 is provided with a limiting clamping slot adapted to the limiting clamping blocks 65, and the limiting clamping slot 302 and the limiting slot 301 communicate with each other. The one-way ratchet 6 is clamped into the limiting slot 301 through the limiting enclosure plate 604, and the limiting clamping blocks 65 are clamped into the limiting clamping slot 302 and are mounted above the single-acting gear 30, and rotate along with the single-acting gear 30.

The one-way ratchet 6 is provided with a spring mounting slot for mounting a key spring 7. One end of the key spring 7 abuts against the upper surface of the single-acting gear 30. The other end of the key spring 7 abuts against the slot bottom of the spring mounting slot.

The lower end of the button 8 is provided with a first mounting column, and the upper end of the one-way ratchet 6 is provided with a mounting hole 61 adapted to the first mounting column. The button 8 is clamped in the mounting hole 61 by the first mounting column and is mounted on the one-way ratchet 6. The upper end of the one-way ratchet 6 is provided with ratchet teeth 62, and the lower end of the surface cover 2 is provided with a clamping slot 22 adapted to the ratchet teeth 62. The surface cover 2 is provided with an opening 23 through which the upper end of the button 8 penetrates, and the button 8 penetrates through the opening 23 to extend out of the upper surface of the surface cover 2.

The driving component is a driving spring 10. The bottom case 1 is provided with two baffles 13, and the two baffles 13 are respectively disposed on both sides of the gear portion 301. Two driving springs 10 are disposed, one driving spring 10 is elastically clamped between one clamping arm 20 and the baffle 13 disposed adjacent to such clamping arm 20. The second main body portion 301 is provided with a second positioning column 207, the second positioning column 207 is disposed in parallel between the third guide portion 203 and the fourth guide portion 204, and the driving spring 10 sleeves outside the second positioning column 207. One end of the driving spring 10 abuts against the inner side wall of the clamping arm 20, and the other end of the driving spring 10 abuts against the outer side wall of the baffle 13. A pressing portion 208 for driving the two clamping arms 20 to slide in a back-to-back manner is disposed on the outer side wall of the third guide portion 203, and the pressing portion 208 extends out from the outer side wall of the bottom case 1.

As a preferred solution, the bottom case 1 is further provided with a limiting plate 14, the limiting plate 14 is disposed at the upper and lower ends of the receiving slot, and the third guide portion 203 is provided with a limiting clamping slot 209 adapted to the limiting plate 14. In this way, the maximum thread of the two clamping arms 20 can be limited, and the two clamping arms 20 will not be released from the bottom case, thereby improving the working stability of the mobile phone holder.

During use, the mobile phone is pressed on the button 8, the button 8 is moved downward under the weight action of the mobile phone, and the one-way ratchet 6 is moved downward therewith until the ratchet teeth 62 are released from the clamping slot 22 at the lower end of the surface cover 2. The driving spring 10 is in a stretching state at this point, and under the action of the driving spring 10, the two clamping arms 20 slide in a face-to-face manner. Under driving of the driving rack portions 206, the single-acting gear 30 is rotated, and under driving of the single-acting gear 30, the two clamping arms 20 are moved in a transverse face-to-face manner until the mobile phone is clamped.

During resetting, the pressing portions 209 are pressed by hand to enable the two clamping arms 20 to slide in a back-to-back manner. Under driving of the rack portions 206, the single-acting gear 30 is rotated. Under driving of the single-acting gear 30, the two clamping arms 20 are moved in a transverse back-to-back manner until the one-way ratchet 6 is re-clamped in the clamping slot 22 under the action of the key spring 7.

Embodiment 3 is as shown in FIG. 9 to FIG. 13, and is a mobile phone holder with an automatic clamping function, including a base and an automatic clamping mechanism disposed on the base. The base includes a bottom case 1 and a surface cover 2. The automatic clamping mechanism includes a clamping arm, a gear, a one-way ratchet 6, a key spring 7, a button 8, and a driving component for driving the gear to rotate.

The two clamping arms divided into a first clamping arm 40 and a second clamping arm 50, and the bottom case 1 is provided with a receiving slot. The first clamping arm 40 includes a third main body portion 401, a first side clamping portion 402 formed by bending upward from one end of the third main body portion 401, and a fifth guide portion 403 formed by extending transversely and outward from the other end of the third main body portion 401. The second clamping arm 50 includes a fourth main body portion 501, a second side clamping portion 502 formed by bending upward from one end of the fourth main body portion 501, and a sixth guide portion 503 formed by extending transversely and outward from the other end of the fourth main body portion 501. The fifth guide portion 403 and the sixth guide portion 503 are oppositely disposed forward and backward. The third main body portion 401 is provided with a third guide slot 404 adapted to the sixth guide portion 503, and the fourth main body portion 501 is provided with a fourth guide slot 504 adapted to the fifth guide portion 403. The third guide slot 404 and the fourth guide slot 504 are oppositely disposed forward and backward. The first clamping arm 40 and the second clamping arm 50 are clamped into the fourth guide slot 504 by the fifth guide portion 403, are clamped into the third guide slot 404 by the sixth guide portion 503, and can be disposed in the receiving slot in a face-to-face or back-to-back slidable manner. The first side clamping portion 402, the second side clamping portion 502, and the base form a clamping space for clamping a mobile phone or a tablet computer.

The gear is a single-acting gear 30, and the two rack portions are divided into a first rack portion 405 and a second rack portion 505. The first rack portion 405 is disposed on the inner side wall of the fifth guide portion 403. The second rack portion 505 is disposed on the inner side wall of the sixth rack portion 503, and the first rack portion 405 and the second rack portion 505 are both engaged with the single-acting gear 30.

Each of the lower ends of the third main body portion 401 and the fourth main body portion 501 is provided with an upwardly concave groove, and a third mounting column 120 protruding downward is disposed in the groove 110. The driving component is a driving tension spring 60, and one driving tension spring 60 is disposed. One end of the driving tension spring 60 sleeves outside the third mounting column 120 of the first clamping arm 40, and the other end of the driving tension spring 60 sleeves outside the third mounting column 120 of the second clamping arm 50.

A fifth guide slot 130 is disposed at the lower end of the fifth guide portion 403 and the sixth guide portion 503, and a first guide block adapted to the fifth guide slot 130 is disposed in the receiving groove.

A pressing block 70 is disposed at each of the front end of the third main body portion 401 and the front end of the fourth main body portion 501. The pressing block 70 includes a vertical portion 701, a transverse portion 702 formed by bending inward from the front end of the vertical portion 701, and a pressing portion 703 formed by bending downward from the tail end of the transverse portion 702. The transverse portions 702 of the two pressing blocks 70 overlap with each other, and the pressing portions 703 of the two pressing blocks 70 extend out from the outer side wall of the bottom case 1.

The receiving slot is provided with a second mounting column 11 therein, and the single-acting gear 30 is provided with a mounting slot adapted to the second mounting column 11. The second mounting column 11 is axially provided with a screw hole 12. The single-acting gear 30 is rotatably mounted on the bottom case 1 by the cooperation between the second mounting column 11 and the mounting slot and by the cooperation between the bolt and the screw hole 12.

The lower end of the one-way ratchet 6 is provided with a limiting enclosure plate 64 protruding downward. The single-acting gear 30 is axially provided with a limiting slot 301 adapted to the limiting enclosure plate 64, and a plurality of downward protruding limiting clamping blocks 65 are disposed at the lower end of the limiting enclosure plate 64. The single-acting gear 30 is provided with a limiting clamping slot 302 adapted to the limiting clamping blocks 65, and the mounting slot, the limiting clamping slot 302 and the limiting slot 301 communicate with each other. The one-way ratchet 6 is clamped into the limiting slot 301 through the limiting enclosure plate 64, and the limiting clamping blocks 65 are clamped into the limiting clamping slot 302 and are mounted above the single-acting gear 30 and rotate along with the single-acting gear 30.

The lower end of the one-way ratchet 6 is provided with a spring mounting slot for mounting the key spring 7. One end of the key spring 7 abuts against the upper surface of the single-acting gear 30. The other end of the key spring 7 abuts against the slot bottom of the spring mounting slot.

The lower end of the button 8 is provided with a first mounting column. The upper end of the one-way ratchet 6 is provided with a mounting groove 63 adapted to the first mounting column, and a first limiting enclosure slot 24 adapted to the one-way ratchet 6 and a second limiting enclosure slot 25 adapted to the button 8 are disposed at the lower end of the surface cover 2. The first limiting enclosure slot 24 the second limiting enclosure slot 25 communicate with each other, and the upper end of the one-way ratchet 6 is provided with ratchet teeth 62. The slot bottom of the first limiting enclosure slot 24 is provided with a clamping slot 22 adapted to the ratchet teeth 62. The button 8 is mounted above the one-way ratchet 6, the first limiting enclosure slot 24 and the second limiting enclosure slot 25 are axially provided with an opening 23 through which the upper end of the button 8 penetrates, and the upper surface of the button 8 penetrates through the opening 23 to extend out of the upper surface of the surface cover 2.

The mobile phone holder with an automatic clamping function further includes a wireless charging coil 80, a circuit board and a power source. The base further includes a middle case 90 disposed between the base case 1 and the surface cover 2, and the middle case 90 is provided with a third placing slot 901 adapted to the wireless charging coil 80 and a second through slot 902 for the one-way ratchet 6 to adaptively penetrate through. The second through slot 902 is disposed in the middle of the third placing slot 901, and the wireless charging coil 80 is placed in the third placing slot 901. The circuit board and the power source are disposed on the bottom case, the wireless charging coil 80 is electrically connected to the circuit board, and the circuit board is electrically connected to the power source.

The mobile phone holder with an automatic clamping function further includes an undercarriage 100 movable forward and backward. The undercarriage 100 includes an undercarriage main body portion 1001 and a support portion 1002 formed by bending upward from the front end of the undercarriage main body portion 1001, and the two side ends of the undercarriage main body portion 1001 are provided with elastic arms 1003 capable of being transversely deformed. The outer side walls of the elastic arms 1003 are provided with positioning clamping blocks 1004 protruding outward, and the surface cover 2 is provided with a retreating slot 26 adapted to the undercarriage main body portion 1001. The two side walls of the retreating slot 26 are provided with positioning clamping slots 27 adapted to the positioning clamping blocks 1004, and the lower end of the undercarriage main body portion 1001 is provided with a sixth guide slot disposed frontward and backward, and the middle case 90 is provided with a second guide block 903 adapted to the sixth guide slot.

The positioning clamping block 1004 is provided with a first inclined surface 1005 inclined inward from front to back, and a second inclined surface 1006 inclined inward from back to front, and the first inclined surface 1005 forms a first included angle with a movement direction of the undercarriage 100. The second inclined surface 1006 forms a second included angle with the movement direction of the undercarriage 100, and the first included angle is less than the second included angle. In this way, the user can push the undercarriage 100 backward with less effort than pulling the undercarriage 100 forward, which is favorable to hold the mobile phone tightly and is convenient for use of the user.

During use, the mobile phone is pressed on the button 8, the button 8 is moved downward under the weight action of the mobile phone, and the one-way ratchet 6 is moved downward therewith until the ratchet teeth 62 are released from the clamping slot 22 at the lower end of the surface cover 2. The driving tension spring 60 is in a stretching state at this point, and under the action of the driving tension spring 60, the first clamping arm 40 and the second clamping arm 50 slide in a face-to-face manner. Under driving of the first rack portion 405 and the second rack portion 505, the single-acting gear 30 is rotated. Under driving of the single-acting gear 30, the first clamping arm 40 and the second clamping arm 50 are moved in a transverse face-to-face manner until the mobile phone is clamped.

During resetting, the pressing portion 703 is pressed by hand to enable the first clamping arm 40 and the second clamping arm 50 to slide in a back-to-back manner. Under driving of the first rack portion 405 and the second rack portion 505, the single-acting gear 30 is rotated. Under driving of the single-acting gear 30, the first rack portion 405 and the second rack portion 505 are moved in a transverse back-to-back manner until the one-way ratchet 6 is re-clamped in the clamping slot 22 under the action of the key spring 7.

In view of the above, those skilled in the art can make various other corresponding changes and modifications according to the technical solutions and technical solutions of the disclosure, and all such changes and modifications shall fall within the protection scope of the claims of the disclosure range.

What is claimed is:

1. A mobile phone holder with an automatic clamping function, comprising: a base and an automatic clamping mechanism disposed on the base, wherein the automatic clamping mechanism comprises a clamping arm, a gear, a one-way ratchet, a key spring, a button and a driving component for driving the gear to rotate, the clamping arm is slidably mounted on the base, a clamping space for clamping a mobile phone or a tablet computer is defined between the clamping arm and the base, the clamping arm is provided with a rack portion, the gear is rotatably mounted in the base, the rack portion is engaged with the gear, the one-way ratchet is mounted above the gear, the one-way ratchet rotates along with the gear, the key spring is elastically clamped between the gear and the one-way ratchet, an upper end of the one-way ratchet is provided with ratchet teeth, the base is provided with a clamping slot adapted to the ratchet teeth, the button is mounted above the one-way ratchet, and the base is provided with an opening through which an upper end of the button penetrates.

2. The mobile phone holder with an automatic clamping function according to claim 1, wherein four clamping arms are disposed, the four clamping arms are slidably disposed on the base diagonally two by two, the gear is a linkage gear, the linkage gear comprises an upper gear portion and a lower gear portion which are integrally connected, the rack portion is engaged with the upper gear portion, the driving component comprises two driving members and two driving springs, the two driving members can be slidably disposed on the base in a face-to-face or back-to-back manner, the driving member is provided with a driving rack portion, the driving rack portion is engaged with the lower gear portion, the base is provided with two baffles, the two baffles are disposed on both sides of the lower gear portion respectively, one driving spring is elastically clamped between one driving member and the baffle disposed adjacent to such driving member, one end of the driving spring abuts against the inner side wall of the driving member, and the other end of the driving spring abuts against the outer side wall of the baffle.

3. The mobile phone holder with an automatic clamping function according to claim 2, wherein a lower end of the one-way ratchet is provided with a limiting column protruding downward, the linkage gear is axially provided with a limiting slot adapted to the limiting column, the one-way ratchet is clamped into the limiting slot through the limiting column and mounted above the linkage gear, and rotates along with the linkage gear, a lower end of the button is provided with a first mounting column, the upper end of the one-way ratchet is provided with a mounting hole adapted to the first mounting column, and the button is clamped into the mounting hole by the first mounting column and mounted on the one-way ratchet.

4. The mobile phone holder with an automatic clamping function according to claim 3, wherein an upper end of the linkage gear is provided with a spring mounting slot for mounting the key spring, one end of the key spring abuts against the slot bottom of the spring mounting slot, and the other end of the key spring abuts against the lower surface of the one-way ratchet.

5. The mobile phone holder with an automatic clamping function according to claim 4, wherein the base comprises a bottom case and a surface cover, the bottom case is provided with a receiving slot, the receiving slot is provided with a second mounting column therein, the linkage gear is provided with a mounting slot adapted to the second mounting column, the second mounting column is provided with a screw hole axially, the linkage gear is provided with a through hole adapted to the screw hole, the through hole, the mounting slot and the limiting slot communicate with each other, the linkage gear is rotatably mounted on the bottom case by the cooperation between the second mounting column and the mounting slot and by the cooperation between the bolt penetrating through the through hole and the screw hole, the two baffles are disposed on the bottom case, and the clamping slot and the opening are both disposed in the surface cover.

6. The mobile phone holder with an automatic clamping function according to claim 5, wherein the base further comprises a middle case disposed between the bottom case and the surface cover, the linkage gear further comprises a connecting portion connected to the upper gear portion and the lower gear portion, the middle case is provided with a first through slot adapted to the connecting portion, the upper gear portion protrudes from the upper surface of the middle case, the upper end of the middle case is provided with two placing slots consistent with the diagonal direction of the middle case, the two placing slots intersect with each other, each placing slot is provided with two relatively staggered guide bars along the direction per se, the clamping arm is provided with chutes adapted to the guide bars, the four clamping arms are matched with the guide bars by the chutes to be slidably disposed in the two placing slots in a two-by-two relatively staggered manner, the placing slots are divided into a first placing slot and a second placing slot, the depth of the first placing slot is greater than the depth of the second placing slot, the mounting slot is disposed on the lower gear portion, the through hole is disposed in the connecting portion, and the limiting slot and the spring mounting slot are disposed on the upper gear portion.

7. The mobile phone holder with an automatic clamping function according to claim 6, wherein the linkage gear comprises a gear portion, a mounting portion, and a connecting portion connected to the gear portion and the mounting portion, the mounting slot is disposed on the gear portion, the through hole is disposed in the connecting portion, and the limiting slot and the spring mounting slot are disposed on the mounting portion; and the two driving members have the same structure, the driving member comprises a first main body portion and a first guide portion and a second guide portion which are formed by transverse extending from one end of the first main body portion, the first guide portion and the second guide portion are disposed in parallel, the second guide portion is provided with a first guide slot adapted to the first guide portion, the two driving members are clamped into the first guide slot by the first guide portion and can be disposed in the receiving slot in a transversely face-to-face or back-to-back slidable manner, the driving rack portion is disposed on the inner side wall of the second guide portion, the first main body portion is provided with a first positioning column, the first positioning column is disposed in parallel between the first guide portion and the second guide portion, and the driving spring sleeves outside the first positioning column.

8. The mobile phone holder with an automatic clamping function according to claim 1, wherein two clamping arms are disposed, the two clamping arms can be disposed on the base in a transversely face-to-face or back-to-back slidable manner, the gear is a single-acting gear, the driving component is a driving spring, the base is provided with two baffles, the two baffles are respectively disposed on both sides of the single-acting gear, two driving springs are disposed, one driving spring is elastically clamped between one clamping arm and the baffle disposed adjacent to such clamping arm, one end of the driving spring abuts against the inner side wall of the clamping arm, and the other end of the driving spring abuts against the outer side wall of the baffle.

9. The mobile phone holder with an automatic clamping function according to claim 8, wherein a lower end of the one-way ratchet is provided with a limiting enclosure plate protruding downward, the single-acting gear is axially provided with a limiting slot adapted to the limiting enclosure plate, a plurality of downward protruding limiting clamping blocks are disposed at a lower end of the limiting enclosure plate, the single-acting gear is provided with a limiting clamping slot adapted to the limiting clamping blocks, the limiting clamping slot and the limiting slot communicate with each other, the one-way ratchet is clamped into the limiting slot through the limiting enclosure plate, the limiting clamping blocks are clamped into the limiting clamping slot and are mounted above the single-acting gear, and rotate along with the single-acting gear, a lower end of the button is provided with a first mounting column, the upper end of the one-way ratchet is provided with a mounting hole adapted to the first mounting column, and the button is clamped into the mounting hole through the first mounting column and mounted on the one-way ratchet.

10. The mobile phone holder with an automatic clamping function according to claim 9, wherein a spring mounting slot for mounting a key spring is disposed at the lower end of the one-way ratchet, one end of the key spring abuts against the upper surface of the single-acting gear, and the other end of the key spring abuts against the slot bottom of the spring mounting slot.

11. The mobile phone holder with an automatic clamping function according to claim 10, wherein the base comprises a bottom case and a surface cover, the bottom case is provided with a receiving slot, the receiving slot is provided with a second mounting column therein, the single-acting gear is provided with a mounting slot adapted to the second mounting column, the second mounting column is axially provided with a screw hole, the mounting slot and the limiting clamping slot communicate with each other, the single-acting gear is rotatably mounted on the bottom case by the cooperation between the second mounting column and the mounting slot and the cooperation between the bolt and the screw hole, two baffles are disposed on the bottom case, and the clamping slot and the opening are both disposed on the surface cover; and the two clamping arms have the same structure, the clamping arm comprises a second main body portion, a side clamping portion formed by bending upward from one end of the second main body portion, and a third guide portion and a fourth guide portion formed by transversely extending from the other end of the second main body portion, the third guide portion and the fourth guide portion are disposed in parallel with each other, the fourth guide portion is provided with a second guide slot adapted to the third guide portion, the two clamping arms are clamped into the second guide slot through the third guide portion, and can be slidably disposed in the receiving slot in a face-to-face or back-to-back manner, the rack portion is disposed on the inner side wall of the fourth guide portion, the second main body portion is provided with a second positioning column, the second positioning column is disposed in parallel between the third guide portion and the fourth guide portion, the driving spring sleeves outside the second positioning column, a pressing portion for driving the two clamping arms to slide in a back-to-back manner is disposed on the outer side wall of the third guide portion, and the pressing portion extends from the outer side wall of the bottom case.

12. The mobile phone holder with an automatic clamping function according to claim 1, wherein two clamping arms are disposed, the two clamping arms can be disposed on the base in a transversely face-to-face or back-to-back slidable manner, the driving component is a driving tension spring, a lower end of the clamping arm is provided with an upwardly concave groove, a third mounting column protruding downward is disposed in the groove, one driving tension spring is disposed, one end of the driving tension spring sleeves outside the third mounting column of one of the clamping arms, the other end of the driving tension spring sleeves outside the third mounting column of the other clamping arm, and the gear is a single-acting gear.

13. The mobile phone holder with an automatic clamping function according to claim 12, wherein a lower end of the one-way ratchet is provided with a limiting enclosure plate protruding downward, the single-acting gear is axially provided with a limiting slot adapted to the limiting enclosure plate, a plurality of downward protruding limiting clamping blocks are disposed at a lower end of the limiting enclosure plate, the single-acting gear is provided with a limiting clamping slot adapted to the limiting clamping blocks, the limiting clamping slot and the limiting slot communicate with each other, the one-way ratchet is clamped into the limiting slot through the limiting enclosure plate, and the limiting clamping blocks are clamped into the limiting clamping slot and are mounted above the single-acting gear and rotate along with the single-acting gear.

14. The mobile phone holder with an automatic clamping function according to claim 13, wherein a spring mounting slot for mounting a key spring is disposed at the lower end of the one-way ratchet, one end of the key spring abuts against the upper surface of the single-acting gear abuts, and the other end of the key spring abuts against the slot bottom of the spring mounting slot.

15. The mobile phone holder with an automatic clamping function according to claim 14, wherein the base comprises a bottom case and a surface cover, the bottom case is provided with a receiving slot, the receiving slot is provided with a second mounting column therein, the single-acting gear is provided with a mounting slot adapted to the second mounting column, the second mounting column is axially provided with a screw hole, the mounting slot and the limiting clamping slot communicate with each other, the single-acting gear is rotatably mounted on the bottom case by the cooperation between the second mounting column and the mounting slot and the cooperation between the bolt and the screw hole, and the clamping slot and the opening are both disposed on the surface cover.

16. The mobile phone holder with an automatic clamping function according to claim 15, wherein a lower end of the button is provided with a first mounting column, the upper end of the one-way ratchet is provided with a mounting groove adapted to the first mounting column, a first limiting enclosure slot adapted to the one-way ratchet and a second limiting enclosure slot adapted to the button are disposed at a lower end of the surface cover, the first limiting enclosure slot the second limiting enclosure slot communicate with each other, the clamping slot is disposed at the slot bottom of the first limiting enclosure slot, the opening is disposed in the axial direction of the first limiting enclosure slot and the second limiting enclosure slot, and the upper surface of the button penetrates through the opening to extend out of the upper surface of the surface cover.

17. The mobile phone holder with an automatic clamping function according to claim 16, wherein the clamping arms are divided into a first clamping arm and a second clamping arm, the first clamping arm comprises a third main body portion, a first side clamping portion formed by bending upward from one end of the third main body portion, and a fifth guide portion formed by extending transversely and outward from the other end of the third main body portion, the second clamping arm comprises a fourth main body portion, a second side clamping portion formed by bending upward from one end of the fourth main body portion, and a sixth guide portion formed by extending transversely and outward from the other end of the fourth main body portion, the fifth guide portion and the sixth guide portion are oppositely disposed forward and backward, the third main body portion is provided with a third guide slot adapted to the sixth guide portion, the fourth main body portion is provided with a fourth guide slot adapted to the fifth guide portion, the third guide slot and the fourth guide slot are oppositely disposed forward and backward, the first clamping arm and the second clamping arm are clamped into the fourth guide slot by the fifth guide portion, are clamped into the third guide slot by the sixth guide portion, and can be disposed in the receiving slot in a face-to-face or back-to-back slidable manner, two rack portions are disposed and are a first rack portion and a second rack portion respectively, the first rack portion is disposed on the inner side wall of the fifth guide portion, the second rack portion is disposed on the inner side wall of the sixth rack portion, each of lower ends of the third main body portion and the fourth main body portion is provided with the above groove and the third positioning column, lower ends of the fifth guide portion and the sixth guide portion are provided with a fifth guide slot, and the receiving slot is provided with a first guide block adapted to the fifth guide slot therein.

18. The mobile phone holder with an automatic clamping function according to claim 17, wherein a pressing block is disposed at each of the front end of the third main body portion and the front end of the fourth main body portion, the pressing block comprises a vertical portion, a transverse portion formed by bending inward from the front end of the vertical portion, and a pressing portion formed by bending downward from the tail end of the transverse portion, the transverse portions of the two pressing blocks overlap with each other, and the pressing portions of the two pressing blocks extend out from the outer side wall of the bottom case.

19. The mobile phone holder with an automatic clamping function according to claim 18, further comprising a wireless charging coil, a circuit board and a power source, wherein the base further comprises a middle case disposed between the base case and the surface cover, the middle case is provided with a third placing slot adapted to the wireless charging coil and a second through slot for the one-way ratchet to adaptively penetrate through, the second through slot is disposed in the middle of the third placing slot, the wireless charging coil is placed in the third placing slot, the circuit board and the power source are disposed on the bottom case, the wireless charging coil is electrically connected to the circuit board, and the circuit board is electrically connected to the power source.

20. The mobile phone holder with an automatic clamping function according to claim 19, further comprising an undercarriage movable forward and backward, wherein the undercarriage comprises an undercarriage main body portion and a support portion formed by bending upward from the front end of the undercarriage main body portion, the two side ends of the undercarriage main body portion are provided with elastic arms capable of being transversely deformed, the outer side walls of the elastic arms are provided with positioning clamping blocks protruding outward, the surface cover is provided with a retreating slot adapted to the undercarriage main body portion, two side walls of the retreating slot are provided with positioning clamping slots adapted to the positioning clamping blocks, a lower end of the undercarriage main body portion is provided with a sixth guide slot disposed frontward and backward, and the middle case is provided with a second guide block adapted to the sixth guide slot; and wherein the positioning clamping block is provided with a first inclined surface inclined inward from front to back, and a second inclined surface inclined inward from back to front, the first inclined surface forms a first included angle with a movement direction of the undercarriage, the second inclined surface forms a second included angle with the movement direction of the undercarriage, and the first included angle is less than the second included angle.

\* \* \* \* \*